United States Patent
Oksenhendler (10) Patent No.: US 12,188,822 B2
(45) Date of Patent: Jan. 7, 2025

(54) DEVICE AND METHOD FOR DIAGNOSING THE COMPRESSIBILITY AT THE CENTRE OF AN ULTRA-SHORT PULSE BASED ON SPATIO-SPECTRAL DATA OF THE PULSE HAVING UNDERGONE A NON-LINEAR EFFECT

(71) Applicant: Thomas Oksenhendler, Gomets-le-Chatel (FR)

(72) Inventor: Thomas Oksenhendler, Gomets-le-Chatel (FR)

( * ) Notice: Subject to any disclaimer, the term of this patent is extended or adjusted under 35 U.S.C. 154(b) by 241 days.

(21) Appl. No.: 17/796,645

(22) PCT Filed: Jan. 30, 2021

(86) PCT No.: PCT/EP2021/052226
§ 371 (c)(1),
(2) Date: Jul. 30, 2022

(87) PCT Pub. No.: WO2021/152161
PCT Pub. Date: Aug. 5, 2021

(65) Prior Publication Data
US 2023/0056265 A1 Feb. 23, 2023

(30) Foreign Application Priority Data
Jan. 31, 2020 (FR) .................. 2000958

(51) Int. Cl.
*G01J 3/453* (2006.01)
(52) U.S. Cl.
CPC ....... *G01J 3/453* (2013.01); *G01J 2003/4538* (2013.01)
(58) Field of Classification Search
CPC ..... G01J 3/453; G01J 2003/4538; G01J 11/00
See application file for complete search history.

(56) References Cited

U.S. PATENT DOCUMENTS 6,052,180 A * 4/2000 Neal .............. G02B 26/06
356/121
9,243,957 B2 1/2016 Quere
(Continued)

FOREIGN PATENT DOCUMENTS

EP 2018060679 11/2018

OTHER PUBLICATIONS

Ian A. Walmsley and Victor Wong, "Characterization of the electric field of ultrashort optical pulses," J. Opt. Soc. Am. B 13, 2453-2463 (1996).

(Continued)

*Primary Examiner* — Tarifur R Chowdhury
*Assistant Examiner* — Carlos Perez-Guzman
(74) *Attorney, Agent, or Firm* — Timur Slonim, Esq.; LAW OFFICE OF TIMUR E. SLONIM, ESQ.

(57) ABSTRACT

The process and device for diagnosing the quality of compression of an ultrashort pulse, consist of performing an approximation of the Strehl ratio by: —a first step allowing the measurement of spatio-spectral images of the ultrashort light pulse brief initial (Ii) using one or more parallel imaging spectrometers; —a second step allowing an interaction of said pulse with a nonlinear optical material (DMNL), the aforementioned interaction generating, by a nonlinear optical mechanism of an n order, a secondary pulse (Is) of intensity proportional to the temporal intensity aforementioned ultrashort light pulse (Ii) raised to the power of n; —a third step allowing the measurement of the spatio-spectral image or images of the secondary pulse (Is); —the processing of the images thus obtained will be translated into an expression of the ratio of the maximum intensity obtained by that which could be obtained for the pulse without phase distortion.

20 Claims, 5 Drawing Sheets

(56) References Cited

U.S. PATENT DOCUMENTS

| | | | |
|---|---|---|---|
| 9,337,922 B2 | 5/2016 | Nuc | |
| 2009/0168070 A1* | 7/2009 | Kaplan | G01J 11/00 |
| | | | 356/453 |
| 2012/0147911 A1* | 6/2012 | Dantus | G01J 11/00 |
| | | | 372/25 |
| 2017/0030776 A1* | 2/2017 | Inoue | G01J 11/00 |
| 2021/0333683 A1* | 10/2021 | Zaouter | G02F 1/3507 |

OTHER PUBLICATIONS

R. Trebino and D.J.Kane : "Using phase retrieval to measure the intensity and phase of ultrashort pulses: Frequency Resolved Optical Gating", J.Opt. Soc.Am.A11, p. 2429-2437, 1993, pour ce qui concerne la m thode Frog.

C.Iaconis and I.A. Walmsley : "Spectral Phase Interferometry for Direct Electric field Reconstruction of ultrashort optical pulses", Opt. Lett, 23, p. 729-794, 1998, pour ce qui concerne la m thode Spider.

C.Dorrer, E.M.Kosik, I.A.Walmsley : Spatio-temporal characterization of the electric field of ultrashort optical pulses using two-dimensional shearing interferometry, App. Phys. B, 74, p. 209-217, 2002.

A. Jullien, O. Albert, G. Cheriaux, J. Etchepare, S. Kourtev, N. Minkovski et S. M. Saltiel Nonlinear polarization rotation of elliptical light in cubic crystals, with application to cross-phase modulation, Josa B, 22, 5, p. 1096-1106, 2005.

J. Goodman, "Introduction to Fourier Optics," McGraw-Hill physical and quantum electronics series, 2005, ISBN 978-0-9747077-2-3.

Christophe Dorrer. "Spatiotemporal Metrology of Broadband Optical Pulses" IEEE Journal of Selected Topics in Quantum Electronics., US, vol. 25, No. 4, Feb. 12, 2019 (Feb. 12, 2019), pp. 1-16. DOI: 10.1109/JSTQE.2019.2899019 ISSN: 1077-260X, XP055785035 the whole document.

Thomas Oksenhendler, Single-shot complete spatiotemporal Strehl ratio metrology of ultrashort laser pulses—theory, Arxiv.org, Cornell University Library, 201 Olin Library Cornell University Ithaca, NY 14853, May 22, 2020, XP01675251, 1-11, the whole document.

Margoto Jean-Baptiste et al., Single-shot diagnosing of spatiotemporal couplings in ultrashort laser pulses by spatiospectral imaging of a third-order nonlinear process, Optics Letters, US, vol. 45, No. 8, Mar. 9, 2020, 2207, 10.1364/OL.385676, 0146-9592, XP055758085, 7, the whole document.

* cited by examiner

DEVICE AND METHOD FOR DIAGNOSING THE COMPRESSIBILITY AT THE CENTRE OF AN ULTRA-SHORT PULSE BASED ON SPATIO-SPECTRAL DATA OF THE PULSE HAVING UNDERGONE A NON-LINEAR EFFECT

The process and the device for diagnosing the quality of compression of an ultrashort pulse, consist in performing an approximation of the Strehl ratio without going through a step for determining the phase of the pulse characterized by: —the first step allowing a decomposition (S) of the aforementioned ultrashort light pulse (I) into two pulses, respectively known as the initial pulse (Ii) and the secondary initial pulse (Iis), of different polarization or propagation direction and whose phase characteristics are essentially identical to said ultrashort light pulse (I), —a second step allowing the measurement of the spatio-spectral image or images (ISS1) of the initial ultrashort light pulse (Ii) using one or more imaging spectrometers in a parallel manner; —a third step allowing interaction of the aforementioned pulse with a nonlinear optical material (DMNL), the aforementioned interaction generating, by a nonlinear optical mechanism of an n order, a secondary pulse (Is) having an intensity proportional to the temporal intensity of the aforementioned ultrashort light pulse (Iis) raised to the power n; —a fourth step allowing the measurement of the spatio-spectral image or images (ISS2) of the second pulse (Is), using one or more imaging spectrometers in a parallel manner; —a fifth step allowing the calculation of the spatio-spectral intensity (ISS3) which would be obtained from the simulation of the nonlinear effect using the spatio-spectral intensity (ISS1) with a phase plate; —a sixth step allows the calculation of the spatio-spectral intensity (ISS4) which would be obtained from the simulation of the nonlinear effect using the spatio-spectral intensity (ISS1) with a very large quadratic phase, stretching the pulse temporally and spatially by at least a factor of 3 relative to the undistorted pulse; a seventh step allowing the estimation of the distortions of the pulse done through comparing the different spectra obtained and translated into the Strehl ratio R, of the pulse using a standard formula:

$R_f$=f(ISS1, ISS2,ISS3,ISS4), where f is a function which provides an estimate of the Strehl ratio from the spatial-spectral intensities provided, for example:

$$f(ISS1, ISS2, ISS3, ISS4) = \sqrt{\frac{Z^2 - Z_\infty^2}{Z_0^2 - Z_\infty^2}},$$

where the ratio Z is the ratio of the width of the spectrum obtained by space-spectral intensity integration (ISS2) according to the spatial dimension over the width of the spectrum obtained by space-spectral intensity integration (ISS1) according to the spatial dimension, the ratio $Z_0$ is the ratio of the width of the spectrum obtained by integration of the spatio-spectral intensity (ISS3) according to the spatial dimension over the width of the spectrum obtained by integration of the spatio-spectral intensity (ISS1) according to the spatial dimension and the ratio $Z_\infty$ is the ratio of the width of the spectrum obtained by space-intensity spectral integration (ISS4) according to the spatial dimension over the width of the spectrum obtained by space-intensity-spectral integration (ISS1) according to the spatial dimension, the widths considered here, for instance, are the standard deviations.

The Technical Field

The present invention concerns a process and a device for measuring the spatial and temporal compression quality of ultrashort light pulses.

It mainly concerns the relative intensity measurements at the focus, that is, the intensity variations due to the spectral, spatial, and spectro-spatial phase distortions of these pulses. It deals with the effects of the spectral, spatial, and spatio-spectral components of the phase, that is, the variations in intensity due to these effects.

It is generally known that the characterization of the compression quality of ultrashort light pulses having a duration between a few femtoseconds and a few picoseconds presents many difficulties. It can be estimated using the Strehl ratio, which is defined as the ratio of the maximum illuminations with and without phase distortions. Therefore, this ratio is between 0 and 1.

The Previous Technique

Several state-of-the-art measurement methods are described in the following document: Dorrer, C., IEEE J. Sel. Top. Quantum Electron. (2019) [nplcit1].

When an ultrashort pulse is available, measuring its spatial and temporal compression quality requires different measurements according to the spatial, temporal, and spatio-temporal dimensions. These measurements may require several successive recordings. Temporal measurement, in particular, includes several so-called self-referenced methods. It is compulsory for these methods to use at least one optical element having a nonlinear response. This is notably recalled in the following document: Ian A. Walmsley and Victor Wong, "Characterization of the electric field of ultrashort optical pulses," J. Opt. Soc. Am. B 13, 2453-2463 (1996) [nplcit2].

Among the self-referenced methods, we can cite the FROG method (Frequency Resolved Optical Gating) and the SPIDER method (Spectral Phase Interferometry for Direct Electric-field Reconstruction). These two methods are described respectively in the following documents: R. Trebino and D. J. Kane: "Using phase retrieval to measure the intensity and phase of ultrashort pulses: Frequency Resolved Optical Gating", J. Opt. Soc. Am. A11, p. 2429-2437, 1993, regarding the FROG method [nplcit3], C. Iaconis and I. A. Walmsley: "Spectral Phase Interferometry for Direct Electric-field Reconstruction of ultrashort optical pulses", Opt. Lett, 23, p. 729-794, 1998, regarding the SPIDER method [nplci4].

In all cases, multiple copies of the initial pulse, modified or unmodified in the spectral domain, are mixed nonlinearly in order to obtain the useful signal. The methods differ according to whether they require a single measurement (one-shot measurement) or multiple measurements corresponding to successive light pulses. In the previous case, these successive pulses must be essentially identical. The methods also differ as to whether the phase can be derived from the measurement using a direct algorithm, or whether they use an otherwise fitting procedure aiming at minimizing the difference between the calculation of the expected measurement for a test spectral phase and the phase measurement itself. For example, the FROG method uses a successive adjustment technique, while the SPIDER method uses a direct algorithm. The direct algorithm is generally preferred given possible uncertainties about the convergence of successive fits.

In addition, the methods differ in their ability to perform spatial, and particularly spatio-temporal measurements, as discussed above. The FROG method does not allow this unambiguous combined measurement between the temporal and the spatial. A spatio-temporal measurement, derived from a single-shot SPIDER method, was achieved at the cost of much greater complexity in the optical setup and to the detriment of instrument sensitivity. It is described in the following document: C. Dorrer, E. M. Kosik, I. A. Walmsley: "Spatio-temporal characterization of the electric field of ultrashort optical pulses using two-dimensional shearing interferometry", App. Phys. B, 74, p. 209-217, 2002 [npl-cit5].

SUMMARY OF THE INVENTION

In particular, the purpose of the invention is to eliminate the disadvantages of the aforementioned methods by exploiting the fundamental advantages of the proposed method, which are, among others, simplicity, sensitivity, single-shot measurement, obtaining an approximation of the Strehl ratio through direct algorithm, and the possibility of space-time-combined measurements of the entire ultrashort pulse. The principle consists of comparing the spatio-spectral images of the initial pulse with those obtained by an interaction of the pulse to be measured with a nonlinear environment.

Technical Issue

Relative intensity measurements at focus, that is, intensity variations due to spectral, spatial, and spectro-spatial phase distortions of these pulses, are difficult to perform and are essential for determining the maximum power of the laser, which is the critical parameter for very high-power systems. The intensity is affected by the effects of the spectral, spatial, and spatio-spectral components of the phase, that is, the intensity variations due to these effects. The low repetition rate of very high-power lasers essentially requires single-shot measurements, that is, no parameter needs to be sampled between successive measurements.

It is generally known that the characterization of the compression quality of ultrashort light pulses having a duration between a few femtoseconds and a few picoseconds presents many difficulties. It can be estimated using the Strehl ratio, which is defined as the ratio of the maximum illuminations with and without phase distortions. Therefore, this ratio is between 0 and 1. A device for measuring or estimating this ratio would make it possible to directly obtain an estimate of the peak power.

Technical Solution

In particular, the purpose of the invention is to eliminate the disadvantages of the aforementioned methods by exploiting the fundamental advantages of the proposed method, which are, among others, simplicity, sensitivity, single-shot measurement, obtaining an approximation of the Strehl ratio through direct algorithm, and the possibility of space-time-combined measurements of the entire ultrashort pulse. The principle consists of comparing the spatio-spectral images of the initial pulse with those obtained by an interaction of the pulse to be measured with a nonlinear environment.

Thus, the method according to the invention may include the following steps:

a. a first step allowing a decomposition (S) of the aforementioned ultrashort light pulse (I) into two pulses, known respectively as the initial pulse (Ii) and the secondary initial pulse (Iis), of different polarization or propagation directions and whose phase characteristics are essentially identical to aforementioned ultrashort light pulse (I), b. a second step allowing the measurement of the spatio-spectral image or images (ISS1) of the ultrashort light pulse (Ii), c. a third step allowing an interaction of the aforementioned pulse with a nonlinear optical material (DMNL), the aforementioned interaction generating, by a nonlinear optical mechanism of an n order, a secondary reference pulse (Irs) having an intensity proportional to the intensity of the aforementioned ultrashort light pulse (Ii) raised to the power of n, d. a fourth step allowing the measurement of the spatio-spectral image or images (ISS2) of the secondary reference pulse (Irs), e. a fifth step allowing for the calculation of the spatio-spectral intensity (ISS3) which would be obtained from the simulation of the nonlinear effect using the spatio-spectral intensity (ISS1) with a phase plate, that is, without phase distortion, f. a sixth step allows the calculation of the spatio-spectral intensity (ISS4) which would be obtained from the simulation of the nonlinear effect using the spatio-spectral intensity (ISS1) with a very large quadratic phase, stretching the impulse temporally and spatially by at least a factor of 3 compared to the undistorted pulse, g. a seventh step allowing the estimating the distortions of the pulse by comparing the different spatio-spectral intensities obtained and translated into the Strehl ratio $R_I$ of the pulse using a standard formula of type:
$R_I=f(ISS1, ISS2, ISS3, ISS4)$, where f is a function that gives an estimate of the Strehl ratio from the provided spectra, for example:

$$f(ISS1, ISS2, ISS3, ISS4) = \sqrt{\frac{Z^2 - Z_\infty^2}{Z_0^2 - Z_\infty^2}},$$

where the Z-ratio is the ratio of the width of the spectrum obtained by the spatial-spectral intensity integration (ISS2) according to the spatial dimension over the width of the spectrum obtained by the integration of the space-spectral intensity (ISS1) according to the spatial dimension, the ratio $Z_0$ is the ratio of the width of the spectrum obtained by the integration of the space-spectral intensity (ISS3) according to the spatial dimension over the width of the spectrum obtained by the integration of the spatio-spectral intensity (ISS1) according to the spatial dimension and the ratio $Z_\infty$ is the ratio of the width of the spectrum obtained by the integration of the spatio-spectral intensity spectral (ISS4) according to the spatial dimension over the width of the spectrum obtained by the integration of the spatio-spectral intensity (ISS1) according to the spatial dimension, the widths considered here are, for instance, the standard deviations.

Eventually, this method can also include several parallel measurements of the ultrashort light pulse according to different spatio-spectral dimensions, which finally allows the characterization of the compression of this pulse according to all its dimensions thanks to the combined results of these measurements.

This principle will be better understood in the following description of an embodiment of the invention.

Previously, the reasons why such a method would differ from existing methods will be discussed.

Advantages Provided

No existing method in the literature can measure the entire compression quality of an ultrashort pulse in a single pulse. Several Spatio-temporal characterization methods have been patented and proposed in literature recently:

a. F. QUERE, V. GALLET, G. PARIENTE, "DEVICE AND METHOD FOR CHARACTERIZATION OF A LIGHT BEAM", U.S. Pat. No. 9,243,957B2, 2016 [patcit1]
b. F. QUERE, A. BOROT, "METHOD FOR SPATIO-SPECTRAL CHARACTERIZATION OF A POLYCHROMATIC PULSED LASER SOURCE", PCT/EP2018/060679 [patcit2].

However, no current method allows diagnosing the compression quality in a single laser shot. Most devices and methods offer complex measurements. In fact, in order to measure the ultrashort pulse, it is necessary to estimate both the amplitude and the phase according to the transverse and temporal-spatial dimensions. Several devices can be used in parallel to characterize on one hand the temporal or spectral dimension and according to the transverse spatial dimensions on the other. But then, the spatio-temporal variations of the pulse are still to be estimated. The techniques described as state-of-the-art in DORRER19 are either complex and difficult to implement, or they require several successive measurements. They all have in common the desire to perform measurements to reconstruct the intensity profile of the ultrashort pulse according to the transverse spatial dimensions to the focal and temporal.

The originality of the invention is to directly estimate the Strehl ratio without trying to reconstruct the intensity profile of the pulse and by including Spatio-temporal distortions in a measurement that can be done in a single acquisition from a single pulse.

BRIEF DESCRIPTION OF THE DRAWINGS

A mode of implementation of the method according to the invention will be described below, by way of a non-limiting example, referencing to the appended drawings in which:

a.
FIGS. 4.a and 4.b represent the spatio-spectral images of the second pulse in the case of a spatio-temporal distortion according to the transverse spatial dimension perpendicular to the plan of FIG. 2a;
e.

Figure 1:
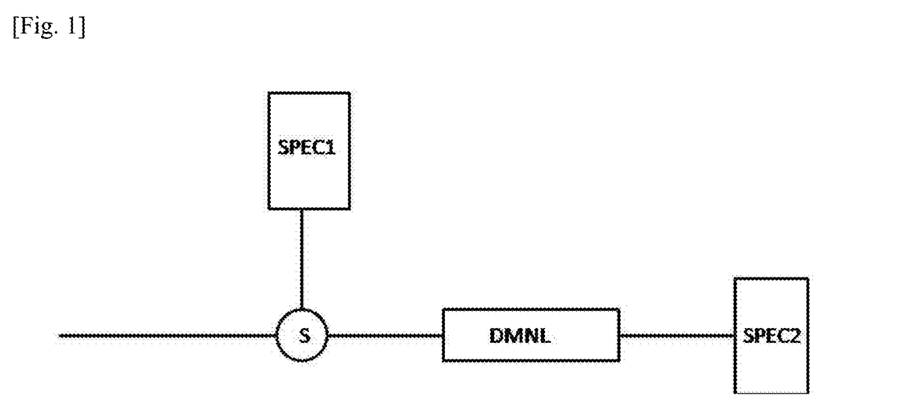
FIG. 1 is a schematic representation of the first version of the assembly according to the invention;
b.

FIG. 1

In the example shown in FIG. 1, is included a pulse-separating device, denoted by S, which produces two output pulses from one input pulse. There are several state-of-the-art devices performing this function. For some of these devices, the polarization of the two output pulses is crossed.

In the schematic representation of FIG. 1, the incident pulse to be measured (I) is firstly separated into two pulses (Ii) and (Iis) using a device S. The pulse (Iis) is then transmitted to the input of a nonlinear medium interaction device, DMNL, defined by a preponderant nonlinear interaction of an n order, for example, a degenerate nonlinear effect of order 3 producing a collinear light with polarization perpendicular to the incident polarization. This type of mechanism is known in French "rotation de polarisation colinéaire" (collinear polarization rotation) and is referred to in Anglo-Saxon literature as the XPW (cross-polarized wave) effect. The interaction effects of an ultrashort pulse with an XPW effect material are described in the publication A. Jullien, O. Albert, G. Cheriaux, J. Etchepare, S. Kourtev, N. Minkovski, and S. M. Saltiel "Nonlinear polarization rotation of elliptical light in cubic crystals, with application to cross-polarized wave generation", Journal of Optical Society of America B 22, 2635 (2005) [nplcit6]. For example, the fluorides of the formula $BaF_2$ and $LiF$ can be used as materials. The DMNL device may include, in addition to the nonlinear material itself, optical focusing components so that the light intensity in the material is optimized for the nonlinear effect according to a transverse spatial dimension or both. The secondary pulse Is, leaving the device DMNL, is of linear polarization. A device of the imaging spectrometer type SPEC1 measures the spectral intensity of the initial pulse (Ii). An imaging spectrometer-type SPEC2 device measures the spectral intensity of the secondary pulse (Is). Each imaging spectrometer-type device stores its image data into a memory (MEMORY 1 for SPEC1, MEMORY 2 for SPEC2). This data is processed by a computer processor. Without restriction, the memories are included in the computer in the diagram shown in [FIG. 1]. Likewise, one or more light intensity attenuation devices can eventually be inserted in the signal path to obtain an appropriate intensity level for the pulses Ii and Is. These additions that are not essential to understanding the principle of operating have not been included in the diagram of [FIG. 1]. Of course, multiple simultaneous measurement channels could be set up by using combinations of multiple S, and SPEC elements.

The spatio-spectral intensity characteristics of the secondary pulse at the output of the DMNL device are examined below based on the phase distortions present in the initial pulse. If one initially assumes that the phase of the pulse to be measured is constant, the nonlinear interaction, having a third order for example, leads to the superimposition of spectral contributions from frequency triplets. If all the frequencies of the spectrum have the same delay and contribute equally, it has been shown in the aforementioned publication, that in the case of a Gaussian spectrum, the resulting spectral band is equal to the incident spectral band multiplied by the square root of 3. In general, for sufficiently small phase variations, the spectral band will be increased. Indeed, the output frequency corresponds to contributions from multiple triplets of frequencies having close delays. In this case, an averaging effect reduces the phase variations concerning the incident phase variations. This effect is proven in theoretical calculations performed in Thomas Oksenhendler's publication "Self-Referenced Spectral Interferometry Theory", Arxiv:1204.4949 (2012). This paper also presents the results of spectral band expansion for all initial pulse spectral shapes and as a function of the different spectral phase contributions.

Figure 2:
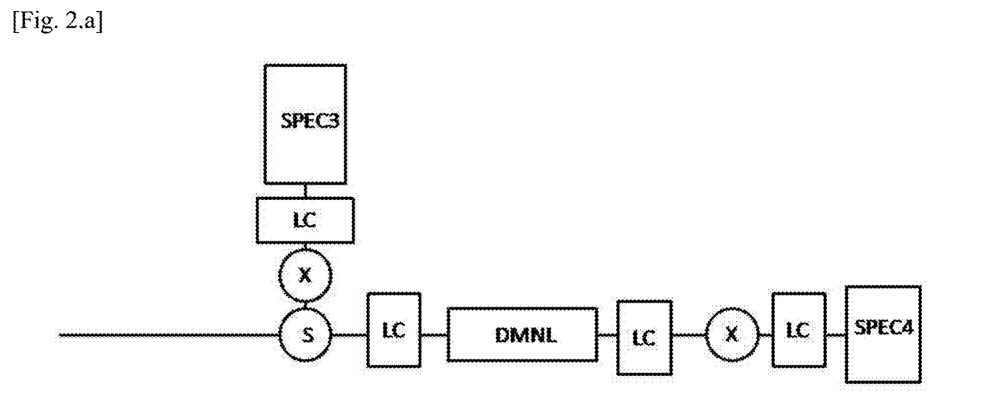
FIGS. 2a, 2b, 2c represent different possible setups depending on the dimension(s) focused on the nonlinear effect and the analysis dimension following the slit of the imaging spectrometer;
c. 3a, 3b represent the spatio-spectral images of the initial pulse and the second pulse in the case of a pulse without distortion called Fourier transform-limited, and for that of a pulse with space-time distortion;
d.

FIG. 2

Different DMNL and SPEC devices can be produced and combined, particularly according to the spatial dimensions focused on the DMNL device and integrated into the SPEC device. In the example of [FIG. 2a], the initial pulse to be measured (I) is first separated by a device S. One part constitutes the initial pulse (Ii) which will then be modified by a device X that rotates the beam at 90 degrees. The dimension that is focused by the cylindrical focusing device LC is perpendicular to the diagram plan. This LC device makes it possible to bring into the SPEC3 apparatus, all the energy of the beam in the analysis slit of the apparatus, the elongated dimension of which is also perpendicular to the diagram plan. Therefore, the initial pulse is analyzed by the SPEC device according to the dimension of the diagram plan and the optical frequencies. In the same figure [FIG. 2a], the second path, that of the secondary initial pulse (Iis) first presents a cylindrical focusing LC device, so that the nonlinear device DMNL acts on the temporal intensity focused according to this dimension. The secondary pulse (Is) is thus obtained by a nonlinear effect on the initial secondary pulse focused along a transverse dimension. A second LC device reshapes the secondary pulse beam. Then, the beam is rotated by 90 degrees as for channel 1 to do the spatio-spectral analysis in the SPEC4 device according to the dimension of the diagram plan, that is, that focused during the nonlinear interaction, and according to the optical frequencies. The measured signals are thus given by the equations:

for SPEC3:Signal=$A\ I_0(x,fy,\lambda)$,      a.

and for SPEC4:Signal=$B\ I_{NL}(x,fy,\lambda)$,      b.

where x is the transverse spatial dimension to the beam and in the diagram plan, y is the transverse spatial dimension perpendicular, $\lambda$ the optical wavelength, A and B are constants, and $I_0$ represents the spatio-temporal intensity of the initial pulse at the level of the DMNL device, $I_{NL}$ that of the intensity of the secondary pulse obtained by the nonlinear effect of the DMNL device. In the geometry considered in [FIG. 2a], we also have: $I_{NL}(kx,y,t)=(I_0(kx,y,t))^n$ in the optical frequency domain kx by focus and in the temporal domain. The intensities in the different domains are obtained by Fourier transform of the equivalent fields as described in equation: $I_0(kx,y,t)=|E_0(kx,y,t)|^2=|TF(x\rightarrow kx, \omega\rightarrow t)[E_0(x,y,\omega)]|^2$, where $\omega$ is the angular frequency or optical pulsation, E represents the complex electric field: $E(x,y,\omega)$, where $\omega=2\pi f$ is the optical pulsation and f the optical frequency, $f=c/\lambda$, c the speed of light, and the transform of Fourier is according to the dimensions specified between parentheses.

In this case of the spatial dimension x to the spatial frequency domain kx proportional to the focal dimension of the cylindrical LC lens according to J. Goodman, ("Introduction to Fourier Optics", McGraw-Hill physical and quantum electronics series, 2005, ISBN 978-0-9747077-2-3) and from the optical pulse dimension $\omega$ to the temporal dimension t.

In the example of [FIG. 2b], the transverse spatial dimensions are crossed with [FIG. 2a]. The analysis is thus done according to the dimension perpendicular to the diagram plan:

for SPEC5:Signal=$A\ I_0(fx,y,\lambda)$,      a.

and for SPEC6:Signal=$B\ I_{NL}(fx,fy,\lambda)$,      b.

where x is the transverse spatial dimension to the beam and in the diagram plan, y the transverse spatial dimension perpendicular, $\lambda$ the optical wavelength, A and B are constants, and $I_0$ represents the spatio-temporal intensity of the initial pulse at the level of the DMNL device, $I_{NL}$ that of the intensity of the secondary pulse obtained by the nonlinear effect of the DMNL device. {In the geometry considered in [FIG. 2b], we also have: $I_{NL}(x,ky,t)=(I_0(x,ky,t))^n$ in the optical frequency domain ky relative to the dimension y by the focusing and in the temporal domain.

In the example of [FIG. 2c], the two transverse spatial dimensions are focused using a spherical focusing device LS (lens or spherical mirror). The analysis is thus done according to the spectral dimension only:

for SPEC7:Signal=$A\ I_0(fx,fy,\lambda)$,      a.

and for SPEC8:Signal=$B\ I_{NL}(fx,fy,\lambda)$,      b.

where $fx$ represents the fact that the spatial dimension transverse to the beam and in the diagram plan is integrated to obtain the signal, likewise $fy$ for the perpendicular transverse spatial dimension, $\lambda$ the optical wavelength, A and B are constants, and $I_0$ represents the spatio-temporal intensity of the initial pulse at the device DMNL, $I_{NL}$ that of the intensity of the secondary pulse obtained by the nonlinear effect of the DMNL device.

In the geometry considered in FIG. 2c, we also have: $I_{NL}(kx,ky,t)=(I_0(kx,ky,t))^n$ in the domain of optical frequencies kx and ky relative to dimensions x and y by the focusing and in the temporal domain.

Figure 3:
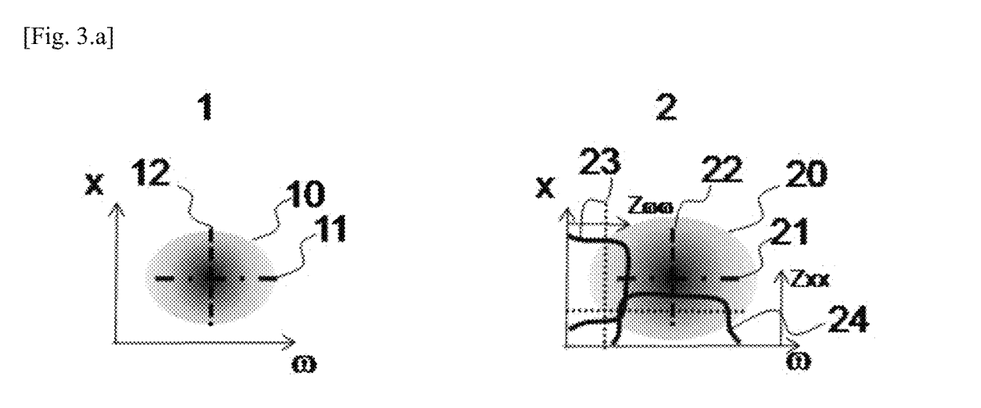

FIG. 3

In the example of FIG. 3a, the assembly considered is that of FIG. 2a, and the incident pulse has no phase error, the pulse is called Fourier transform-limited and its Strehl ratio is equal to its maximum value of 1. The spatio-spectral images measured by the SPEC3 (10) and SPEC4 (20) devices are respectively shown in graphs 1 and 2. Image 10 can be analyzed, for example, by plotting the value of the central positions, in the sense of the barycenters, of the beam as a function of the pulsation to obtain curve 11, or of the central optical pulsations to obtain curve 12. On a beam with no spatio-spectral coupling, these curves are straight, horizontal for one and vertical for the other, and therefore perpendicular. After the nonlinear effect, the image (20) obtained on the SPEC4 device shows an enlargement in the two dimensions x and $\omega$. It is also possible to plot the curves of the central positions and pulsations 21, and 22 respectively. These curves are modified according to the spatiotemporal couplings and make it possible to identify the coupling in question. This qualitative diagnosis is supplemented by a quantitative estimate based on the broadening obtained Z. The broadening is defined as the ratio between the width considered (according to x,y or ω) obtained for the pulse having undergone the non-linear effect on the width considered (according to x,y or ω) obtained on the initial pulse. For the device of FIG. 2a, the two dimensions are x and ω. It can therefore be a matter of spectral widening according to the optical pulsations $Z_{\omega\omega}(x)$ according to the position x curve 23, or spatial widening according to the dimension x Zxx(ω) as a function of the optical pulsation ω, curve 24. In the case of a perfectly compressed or focused pulse, said to be limited by Fourier transform, the widening is maximal and has a value of Zx0(ω) as a function of ω or $Z_{\omega 0}(x)$ as a function of x, calculated directly from the image of the initial pulse 10. The initial pulse has a smaller surface than the enlarged pulse, to avoid significant measurement errors related to the large margin of error on the determination of the widths on signals close to noise, the enlargement is considered only in the area where the initial pulse presents a sufficient signal concerning the measurement noise. The broadening curves are weighted by a windowing curve equal to 1 when the signal of the initial pulse is significant compared to the noise and 0 otherwise. To simplify the analysis, by integrating images 10 and 20 according to one dimension (respectively x or w), we obtain the widening Z according to the dimension considered Zxx or $Z_{\omega\omega}$ as the ratio of the widths of the profiles obtained according to x and w for 20 and 10. The integration is also done by considering a windowing curve equal to 1 when the signal of the initial pulse is significant compared to the measurement noise and 0 otherwise. The broadening value thus found is a maximum for the pulse without phase distortion (compressed to its Fourier limit) and is worth a value respectively Zx0 or $Z_{\omega 0}$ calculated from frame 10 assuming a phase plate. For example, for a Gaussian profile, this value is √3. When all the broadenings are at their maximum values, the pulse is perfectly temporally compressed or spatially focused which results in the fact that its Strehl ratio RI, which corresponds to the ratio of the maximum intensity obtained at the focus by the maximum intensity that can be obtained (that is, without phase distortion or limited by the Fourier transform), is maximal and equals 1.

In the example of FIG. 3b, the assembly considered is still that of FIG. 2a, but this time the incident pulse has a spatio-temporal phase defect called inclination of the pulse front ("Pulse Front Tilt"). This type of defect is for example due to a prism or a diffraction grating. It corresponds to a variable delay depending on a spatial dimension. Let us consider here that this defect is only according to the dimension x that of the plan of FIG. 2a. The spatio-spectral images measured by the SPEC3 (30) and SPEC4 (40) devices are respectively shown in graphs 1 and 2.

Curves 31 and 32 represent the values of the central positions, in the sense of the barycenters. On a beam with no spatio-spectral coupling, these curves are straight and perpendicular (one is horizontal, and the other is vertical). The effect is considered to be a pure phase effect, it is not visible on image 30 and curves 31 and 32. After the nonlinear effect, the image obtained (40) on the SPEC4 device no longer shows enlargement in both dimensions. The curves of the central positions and pulsations 41 and 42 are respectively straight and perpendicular (one is horizontal, and the other is vertical). From the enlargements obtained weighted by the windowing linked to the value of the initial signal concerning the measurement noise, we will estimate the Strehl ratio of the pulse. Broadening is defined as the ratio between the width considered (along x,y or ω) obtained for the pulse having undergone the nonlinear effect on the width considered (along x,y or ω) obtained on the initial pulse. For the device of FIG. 2a, the two dimensions are x and ω. It can therefore be a matter of spectral broadening according to the optical pulsations $Z_{\omega\omega}(x)$ as a function of the position x curve 43, or of spatial broadening as a function of the dimension x Zxx(ω) as a function of the optical pulsation ω, curve 44. In the case of a pulse whose inclination of the pulse front or "Pulse Front Tilt" doubles the duration at the focus and the focal spot, the broadening is limited in both dimensions and is worth a value close to 1. The comparison of this value with the maximum enlargement value $Z_{x0}(\omega)$ or $Z_{\omega 0}(x)$ calculated from image 30 by considering a phase plate makes it possible to directly estimate the Strehl ratio of the pulse according to distortions in these two dimensions using the formula introduced in this invention. Depending on the dimension x, this Strehl ratio is expressed by a formula of the type:

$$R_{Ixx}(\omega) = \sqrt{\frac{Z_{xx}^2(\omega) - Z_{x\infty}^2(\omega)}{Z_{x0}^2(\omega) - Z_{x\infty}^2(\omega)}},$$

where $Z_{xx}(\omega)$ is the spatial enlargement calculated by taking the ratio of the widths of the profiles obtained for each pulse u for images 40 and 30, $Z_{x0}(\omega)$ is the spatial enlargement according to x obtained for the pulse ω for the pulse without phase distortion and where $Z_{x\infty}(\omega)$ is the spatial widening along x obtained for the pulse ω for the pulse with infinite quadratic phase distortion along x (highly divergent beam). We find that this ratio is equal to 1 if the pulse is perfectly focused, and decreases to zero if it is infinitely spatially stretched.

According to the dimension ω, this Strehl ratio is expressed by a formula of the type:

$$R_{I\omega\omega}(x) = \sqrt{\frac{Z_{\omega\omega}^2(x) - Z_{\omega\infty}^2(x)}{Z_{\omega 0}^2(x) - Z_{\omega\infty}^2(x)}},$$

where $Z_{\omega\omega}^2(x)$ is the square of the spectral broadening calculated by taking the ratio of the widths of the spectra obtained for each position x for images 40 and 30, $Z_{\omega 0}^2(x)$ is the square of the broadening spectral according to ω obtained for position x for the pulse without phase distortion and where $Z_{\omega\infty}^2(x)$ is the square of the spectral broadening according to ω obtained for position x for the pulse with an infinite quadratic phase distortion according to ω (highly divergent beam). We find that this ratio is equal to 1 if the pulse is perfectly compressed, and decreases to zero if it is infinitely in temporarily stretching. The study of these two curves makes it possible to determine whether the pulse is qualitatively distorted according to the dimensions x and ω. By integrating the image obtained along one dimension (x or ω), we obtain the integrated ratio along one dimension. For an integration according to x of the intensity of images 30 and 40, we obtain the ratio according to ω:

$$R_{I\omega} = \sqrt{\frac{Z_\omega^2 - Z_{\infty\omega}^2}{Z_{0\omega}^2 - Z_{\infty\omega}^2}},$$

where $Z_\omega^2$ is the square of the broadening calculated by taking the ratio of the widths of the profiles obtained for images 40 and 30, $Z_{0\omega}^2$ is the square of the spectral broadening according to ω obtained for the pulse without phase distortion and where $Z_{\infty\omega}^2$ is the square of the spectral broadening according to ω obtained for the pulse with an infinite quadratic phase distortion according to ω (highly stretched pulse). We find that this ratio is equal to 1 if the pulse is perfectly compressed, and decreases to zero if it is infinitely temporarily stretched. And for integration according to ω of the intensity of images 30 and 40, we obtain the ratio according to x:

$$R_{Ix} = \sqrt{\frac{Z_x^2 - Z_{\infty x}^2}{Z_{0x}^2 - Z_{\infty x}^2}},$$

where $Z_x^2$, where is the square of the widening calculated by taking the ratio of the widths of the profiles obtained for images 40 and 30 by integrating according to ω, $Z_{0x}^2$ is the square of the spatial broadening along x obtained for the pulse without phase distortion and where $Z_{\infty x}^2$ is the square of the spatial broadening along x for the pulse with infinite quadratic phase distortion along x (highly divergent beam). We find that this ratio is equal to 1 if the pulse is perfectly focused, and decreases to zero if it is infinitely spatially stretched.

These two ratios correspond to the Strehl ratios of the pulse, taking into account only the phase distortions affecting this dimension. For example, a quadratic phase purely along x will only affect $R_{Ix}$. Respectively, a phase-only according to ω will only affect $R_{I\omega}$. On the other hand, a phase of spatio-temporal type affecting both according to x and ω will affect both ratios. The global Strehl ratio of the pulse for the dimensions x and ω is obtained as the product of the different previous ratios:

$R_I = R_{Ix} R_{I\omega}.$

Figure 4:
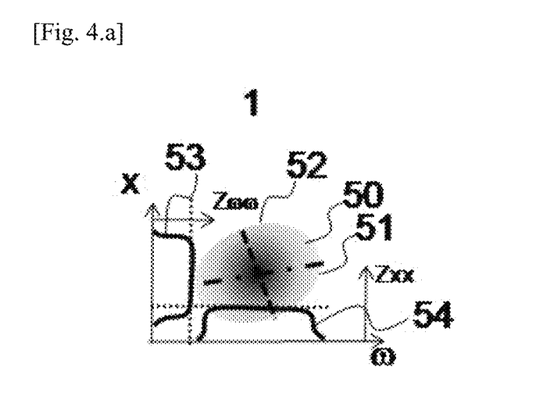

FIG. 4

In the example of FIG. 4a, the initial pulse is that of the previous example comprising an inclination of the pulse front or "Pulse Front Tilt" we add a dispersive element on the path of the pulse essentially adding a second-order spectral phase ("chirp") term. The image obtained on the SPEC3 device is then always identical to images 10 and 30. In this figure, graph 1 only represents the image obtained on the SPEC4 device after the nonlinear effect 50. It is observed on the curves of the central positions 51 and 52 that they are no longer perpendicular (nor horizontal for one and vertical for the other) which is characterized according to the invention of a spatio-temporal effect. Enlargements are also limited in both dimensions. By integrating the image obtained along one dimension (x or ω), we obtain the integrated ratio along one dimension. For an integration according to x of the intensity of images 30 and 50, we obtain the ratio according to ω:

$$R_{I\omega} = \sqrt{\frac{Z_\omega^2 - Z_{\infty\omega}^2}{Z_{0\omega}^2 - Z_{\infty\omega}^2}},$$

where $Z_\omega^2$ is the square of the broadening calculated by taking the ratio of the widths of the profiles obtained for images 50 and 30 by integrating along x, $Z_{0\omega}^2$ is the square of the spectral broadening along w obtained for the pulse without phase distortion and where $Z_{\infty\omega}^2$ is the square of the spectral broadening according to ω obtained for the pulse with infinite quadratic phase distortion according to ω. We find that this ratio is equal to 1 if the pulse is perfectly compressed, and decreases to zero if it is infinitely temporarily stretched. And for integration according to ω of the intensity of images 30 and 50, we obtain the ratio according to x:

$$R_{Ix} = \sqrt{\frac{Z_x^2 - Z_{\infty x}^2}{Z_{0x}^2 - Z_{\infty x}^2}},$$

where $Z_x^2$ is the square of the widening calculated by taking the ratio of the widths of the profiles obtained for images 50 and 30 by integrating according to ω, $Z_{0x}^2$ is the square of the spatial enlargement according to x obtained for the pulse without phase distortion and where $Z_{\infty x}^2$ is the square of the spatial enlargement according to x obtained for the pulse with an infinite quadratic phase distortion according to x (highly divergent beam). We find that this ratio is equal to 1 if the pulse is perfectly focused, and decreases to zero if it is infinitely spatially stretched.

In the case of the wave front inclination along only x and ω, the two ratios $R_{I\omega}$ and $R_{Ix}$ are reduced by the distortion, and we find the effect on the ratio of Strehl global of the pulse for the dimensions x and ω by the product of the various previous ratios: $R_I = R_{Ix} R_{I\omega}$.

The effect of an inclination of the pulse front according to the dimensions y and ω alone is not quite visible by the assembly of FIG. 2a. As shown in FIG. 4b, the spatio-spectral image obtained (60) for the second pulse is then lacking any significant effect along x. Only the effect along ω is visible, but cannot be distinguished from a pure effect uniquely along ω as a pure quadratic phase. Indeed, in the space of x and temporal dimensions, the initial pulse only presents distortions according to ω. Curves 61 and 64 indicate a pulse limited by Fourier transform along dimension x. Whereas curve 63 indicates that the pulse is not compressed at best temporally. Curve 62 does not show any other spatio-temporal coupling. The estimate of the Strehl ratio as introduced previously will only take into account the effect on the dimension ω but the contribution according to the dimension y will be missing in order to have an estimate of the Strehl ratio of the impulse along all dimensions (x, y, and w). An additional measurement according to the dimensions y and ω are necessary.

Figure 5:
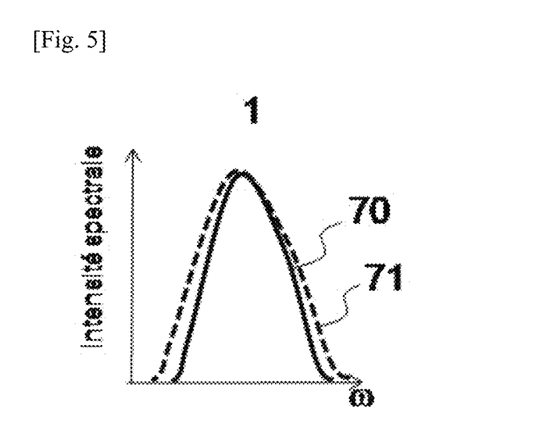
FIG. 5 represents the curves of the spectral intensities of the initial and secondary pulses in the case of a spatio-temporal distortion according to the transverse spatial dimension perpendicular to the plane of FIG. 2a, measured with a device similar to that of FIG. 2c;
f.

FIG. 5

In the example of FIG. 5, the initial pulse is that of the preceding example comprising an inclination of the front along y, the curves obtained by an assembly with spherical focalizations as described in FIG. 2c are represented on the graph. We observe the influence of the distortion effect on the width of the spectrum of the secondary pulse obtained. It is thus possible to go back to an estimate $R_I$ of the Strehl ratio including all the distortions involving the dimension ω including spatio-temporal distortions, that is, those combined not only with x but also with y by applying the formula:

$$R_I = \sqrt{\frac{Z^2 - Z_\infty^2}{Z_0^2 - Z_\infty^2}},$$

where $Z^2$ is the square of the spectral broadening calculated by taking the ratio of the widths of the obtained spectra 71 and 70, $Z_0^2$ is the square of the spectral broadening obtained for the pulse without phase distortion from spectrum 70 and where $Z_\infty^2$ is the square of the spectral broadening obtained for the pulse with infinite quadratic phase distortion from spectrum 70. We find that this ratio is equal to 1 if the pulse is perfectly focused and compressed, and decreases to zero if it is infinitely stretched. As a reminder for Gaussian profiles, $$Z_0^2 = 3 \text{ and } Z_\infty^2 = \frac{1}{Z_0^2} = 1/3.$$

The resulting ratio $R_I$ is a good measure of Strehl's ratio and is always greater than or equal to the actual ratio. It, therefore, constitutes an excellent quantitative diagnosis for the quality of pulsed lasers, but without being able to distinguish the origin of these distortions or to determine the temporal intensity profile or the spectral phase.

Figure 6:
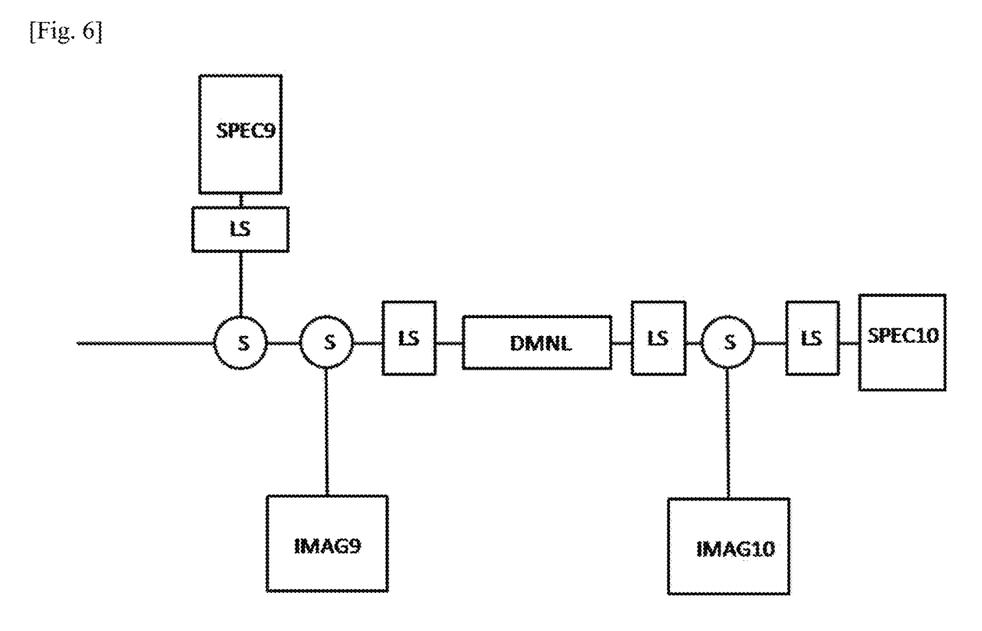
FIG. 6 is a schematic representation of a second version of the setup according to the invention, in which the measurements of the spatial images and the spectral measurements of the initial and secondary pulse are performed simultaneously with SPEC9 and SPEC10 and IMAG9 spectrometers and IMAG10 cameras;
g.

FIG. 6

In the example of FIG. 6, the measurements of the spectral and spatial images of the initial pulse and secondary pulse are formed simultaneously in a parallel manner. The first measurements are those of the initial pulse (Ii) as described in diagram 1 of FIG. 6. These measurements are obtained directly without DMNL. The SPEC9 spectrometer measures the integrated spectral intensity on the transverse spatial dimensions x and y: Signal=A9 $I_0(\int x, \int y, \lambda)$, where $\int x$ represents the fact that the transverse spatial dimension to the beam and in the diagram plan is integrated to obtain the signal, likewise $\int y$ for the transverse spatial dimension perpendicular, $\lambda$ the optical wavelength, A9 is a constant, and $I_0$ represents the spatio-spectral intensity of the initial pulse. Similarly, the IMAG9 camera measures the integrated spatial intensity on the spectral dimension $\lambda$ according to the two transverse spatial dimensions x and y: Signal=B9 $I_0(x, y, \int \lambda)$, where $\int \lambda$ represents the fact that the spectral dimension of the beam is integrated to obtain the signal, B9 is a constant, and $I_0$ represents the spatio-spectral intensity of the initial pulse.

Simultaneously, on the same pulse, the SPEC10 spectrometer measures the integrated spectral intensity over the x and y transverse spatial dimensions of the secondary pulse: Signal=A10 $I_{NL}(\int x, \int y, \lambda)$, where $\int \lambda$ represents the fact that the transverse spatial dimension to the beam and in the diagram plan is integrated to obtain the signal, likewise $\int y$ for the perpendicular transverse spatial dimension, $\lambda$ the optical wavelength, A10 is a constant, and $I_{NL}$ represents the intensity of the secondary pulse obtained by the nonlinear effect of the DMNL device The IMAG10 camera measures the integrated spatial intensity on the spectral dimension $\lambda$ according to the two transverse spatial dimensions x and y: Signal=B10 $I_{NL}(x, y, \int \lambda)$, where $\int \lambda$ x represents the fact that the spectral dimension of the beam is integrated to obtain the signal, B10 is a constant, and $I_{NL}$ represents the intensity of the secondary pulse obtained by the nonlinear effect of the DMNL device.

This device makes it possible to obtain from the signals of SPEC9 and SPEC10 the curves 70 and 71 of FIG. 5 and therefore to estimate, as described above, the Strehl ratio linked to the spectral dimension by applying the formula:

$$R_{I\omega} = \sqrt{\frac{Z^2 - Z_\infty^2}{Z_0^2 - Z_\infty^2}},$$

where $Z^2$ is the square of the spectral broadening calculated by taking the ratio of the widths of the obtained spectra 71 and 70, $Z_0^2$ is the square of the spectral broadening obtained for the pulse without phase distortion from spectrum 70 and where $Z_\infty^2$ is the square of the spectral broadening obtained for the pulse with infinite quadratic phase distortion from spectrum 70. We find that this ratio is equal to 1 if the pulse is perfectly focused and compressed, and decreases to zero if it is infinitely stretched. And from the signals of the IMAG9 and IMAG10 cameras, we can estimate the contributions to the Strehl ratio of the spatial dimensions x and y. For an integration, according to y of the intensity of the images, we obtain the ratio according to x:

$$R_{Ix} = \sqrt{\frac{Z_x^2 - Z_{\infty x}^2}{Z_{0x}^2 - Z_{\infty x}^2}},$$

where $Z_x^2$ is the square of the spatial widening along x calculated by taking the ratio of the widths of the profiles obtained for the integrated images along y, $Z_{0x}^2$ is the square of the spatial widening along x obtained for the pulse without phase distortion and where $Z_{\infty x}^2$ is the square of the spatial widening along x obtained for the pulse with an infinite quadratic phase distortion along x (highly divergent beam). For an integration, according to x of the intensity of the images, we obtain the ratio according to y:

$$R_{Iy} = \sqrt{\frac{Z_y^2 - Z_{\infty y}^2}{Z_{0y}^2 - Z_{\infty y}^2}},$$

where $Z_y^2$ is the square of the spatial widening along y calculated by taking the ratio of the widths of the profiles obtained for the integrated images along x, $Z_{0y}^2$ is the square of the spatial widening along y obtained for the pulse without phase distortion and where $Z_{\infty y}^2$ is the square of the spatial widening along y obtained for the pulse with an infinite quadratic phase distortion along y (highly divergent beam). The global Strehl ratio of the impulse integrating the contributions according to all the dimensions (x, y, and ω) is obtained by the product of the previously calculated ratios: $R_I = R_{Ix} R_{Iy} R_{I\omega}$.

This example is the first single-shot measurement of the Strehl ratio of an ultrashort pulse including contributions from all types of spectral, spatial, and spatio-temporal phase distortions.

Figure 7:
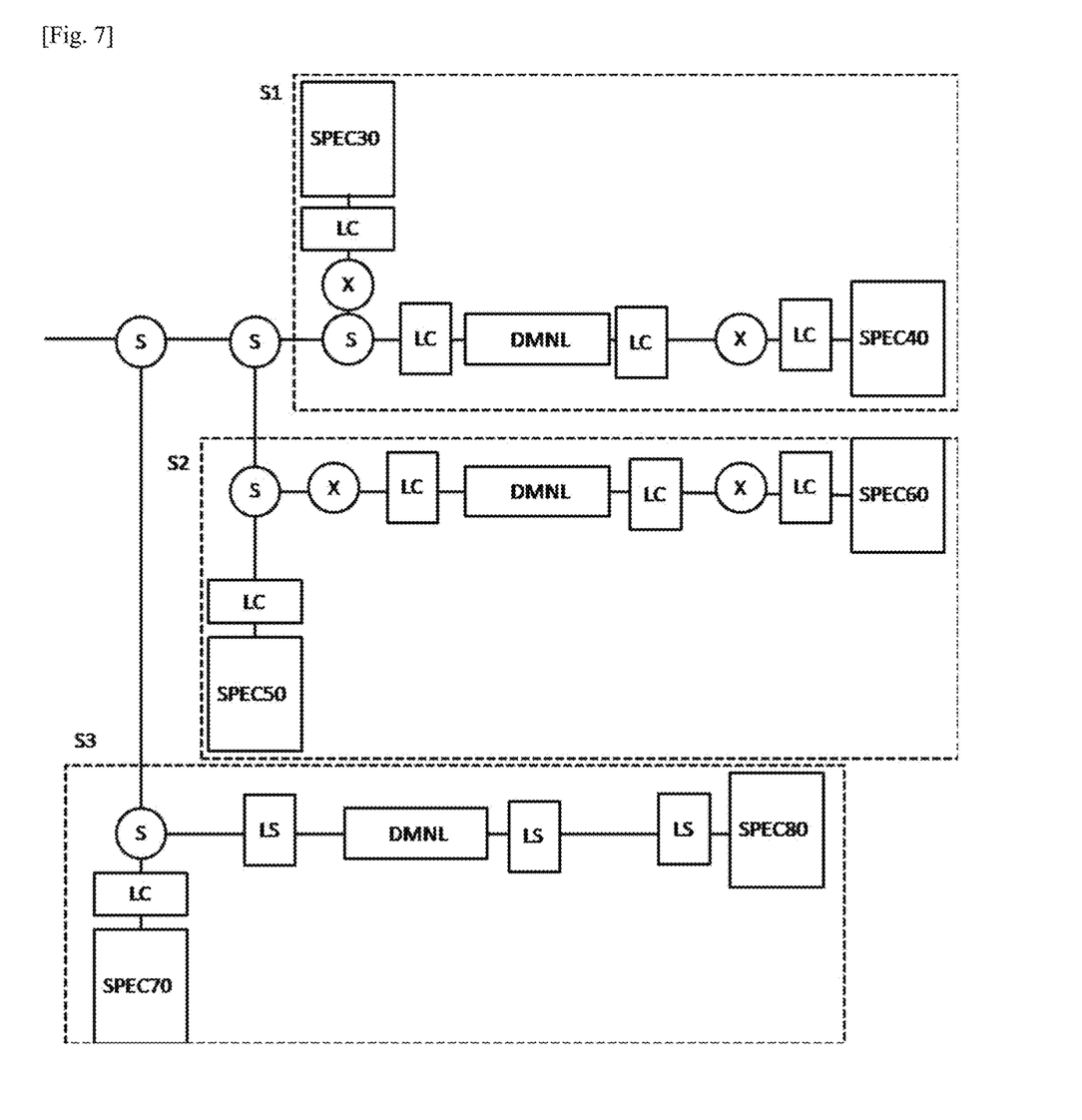
FIG. 7 is a schematic representation of the version of the invention that makes it possible to measure all spatio-spectral images and spectral curves in a single acquisition of the same initial pulse.

FIG. 7

In the example of FIG. 7, the initial pulse to be measured (Im) is first separated by two first device S. These two devices divide the initial pulse to be measured (Im) into three pulses which will be measured simultaneously by three devices schematized by s1, s2, and s3. s1 corresponds to an assembly similar to that of FIG. 2a, s2 to an assembly such as FIG. 2b and s3 respectively for FIG. 2c. The measured signals are thus given by the equations:

for SPEC30:Signal=$A\ I_{kx,0}(x,fy,\lambda)$, a.

for SPEC40:Signal=$B\ I_{kx,NL}(x,fy,\lambda)$, b.

for SPEC50:Signal=$C\ I_{ky,0}(fx,y,\lambda)$, c.

for SPEC60:Signal=$D\ I_{ky,NL}(fx,y,\lambda)$ d.

for SPEC70:Signal=$E\ I_{kx,ky,0}(fx,fy,\lambda)$, e.

and for SPEC80:Signal=$F\ I_{kx,ky,NL}(fx,fy,\lambda)$ f.

where x is the transverse spatial dimension to the beam and in the diagram plan, $fx$ means that the signal is integrated according to this dimension, y the perpendicular transverse spatial dimension, $fx$ means that we integrate the signal along this dimension, $\lambda$ the optical wavelength, A, B, C, D, E, and F are constants, and $I_{kx,0}$ ($I_{ky,0}$ and $I_{kx,ky,0}$ respectively) represents the spatio-spectral intensity of the initial impulse in the domain kx (respectively ky and (kx,ky)) of spatial frequencies and time, $I_{kx,NL}$ (respectively $I_{ky,NL}$ and $I_{kx,ky,NL}$) that of the intensity of the secondary pulse obtained by the non-linear effect of the DMNL device in the optical frequency domain kx (respectively ky and (kx,ky)) by focus and time. The intensities in the different domains are obtained by Fourier transform of the equivalent fields as described on the equation for example: [math.5] $I_0(kx,y,t)=|E_0(kx,y,t)|^2=ITF(x\rightarrow kx, \omega\rightarrow t)[E_0(x,y,\omega)]|^2$, where $\omega$ is the angular frequency or optical pulsation, E represents the complex electric field: E(x, y,$\omega$), where $\omega=2\pi f$ is the optical pulsation and f the optical frequency, $f=c/\lambda$, c is the speed of light, and the transform of Fourier is according to the dimensions specified between parentheses. In this case of the spatial dimension x to the spatial frequency domain kx proportional to the focal dimension of the cylindrical LC lens according to J. Goodman, ("Introduction to Fourier Optics", McGraw-Hill physical and quantum electronics series, 2005, ISBN 978-0-9747077-2-3) and from the optical pulse dimension $\omega$ to the temporal dimension t.

Similarly to the device in FIG. 6, this device makes it possible to estimate the overall Strehl ratio from the product of the Strehl ratios obtained from the different signals as explained above. The SPEC30 and SPEC40 spectrometers provide spatio-spectral images in the (x, $\omega$) domain and therefore allow the determination of the Strehl ratios related to this domain. The SPEC50 and SPEC60 spectrometers provide spatio-spectral images in the (y, $\omega$) domain and therefore allow the determination of the Strehl ratios related to this domain. Finally, the SPEC70 and SPEC80 spectrometers make it possible to obtain curves similar to FIG. 5, that is, in the $\omega$ domain, and therefore allow the determination of the Strehl ratio linked to this domain. They provide additional validation of previous measurements.

The set of curves and images obtained makes it possible to determine the origin of the phase distortions, whether they are spectral, spatial according to x or y, or spatio-temporal according to (x-$\omega$) or (y-$\omega$) according to the deformations of the curves. This is the first single-shot method of measuring the Strehl ratio of an ultrashort pulse including contributions from all types of spectral, spatial, and spatio-temporal phase distortions.

Generalization of the Invention

The third-order nonlinear effect producing cross-polarization (collinear polarization rotation) is not the only one that can be used in the invention. One can use any nonlinear order of order n greater than or equal to 2 called instantaneous, the result of which is that the pulse obtained has a temporal intensity and according to the spatial dimensions at the level of the nonlinear environment such that it is directly proportional to the power of n of the temporal intensity of the initial pulse at the level of the nonlinear medium. The degenerate third-order nonlinear effect considered above is only one example among the usable nonlinear orders. On the other hand, the combination of two or more stages of nonlinear effects can also be used.

Instantaneous nonlinear effects that are particularly interesting in our case are the effects obtained at the level of the experiments directly such as the generation of harmonic 2 or 3 on the surface or in gases. The measurement can thus be carried out directly at the level of the experiment.

DESCRIPTION OF EMBODIMENTS

In the embodiment of the invention above, the spatio-spectral images can be processed directly at the level of the calculator to give an evaluation of the Strehl ratio. They can also be used to diagnose the origin of distortions. If the pulse is significantly distorted, then its Strehl ratio is significantly lower than 1 (for example, 0.2). The observation of the image is curved, which can be associated with it such that the central positions and the enlargements are characteristic of the defects. There may remain an ambiguity, for example between a pulse comprising a combination of spectral dispersion and spatial dispersion, with a pulse comprising exclusively an inclination of the pulse front. The spatio-spectral images are identical. But by adding a spectral or spatial dispersion, then the images become different and then reveal a signature of the origin of the distortion.

The invention can be used to optimize the output's characteristics of laser systems. The laser then comprises one or more shaping devices whose characteristics will be modified in a feedback loop in order to obtain the characteristics sought by the user. In many cases, the desired characteristic is the cancellation of phase distortions.

LIST OF CITED DOCUMENTS

Patent Documents patcit1: F. QUERE, V. GALLET, G. PARIENTE, "DEVICE AND METHOD FOR CHARACTERIZATION OF A LIGHT BEAM", U.S. Pat. No. 9,243,957B2, 2016 patcit2: F. QUERE, A. BOROT, "METHOD FOR SPATIO-SPECTRAL CHARACTERIZATION OF A POLYCHROMATIC PULSED LASER SOURCE", PCT/EP2018/060679.

Non-Patent Literature nplcit1: Dorrer, C., IEEE J. Sel. Top. Quantum Electron. (2019). DORRER19 nplcit2: Ian A. Walmsley and Victor Wong, "Characterization of the electric field of ultrashort optical pulses," J. Opt. Soc. Am. B13, 2453-2463 (1996).

nplcit3: R. Trebino and D. J. Kane: "Using phase retrieval to measure the intensity and phase of ultrashort pulses: Frequency Resolved Optical Gating", J. Opt. Soc. Am. A11, p. 2429-2437, 1993, in regards to the FROG method, nplcit4: C. Iaconis and I. A. Walmsley: "Spectral Phase Interferometry for Direct Electric-field Reconstruction of ultrashort optical pulses", Opt. Lett, 23, p. 729-794, 1998, in regards to the SPIDER method.

nplcit5: C. Dorrer, E. M. Kosik, I. A. Walmsley: "Spatio-temporal characterization of the Electric-field of ultrashort optical pulses using two-dimensional shearing interferometry", App. Phys. B, 74, p. 209-217, 2002.

nplcit6: A. Jullien, O. Albert, G. Cheriaux, J. Etchepare, S. Kourtev, N. Minkovski et S. M. Saltiel "Nonlinear polarization rotation of elliptical light in cubic crystals, with application to cross-polarized wave generation", Journal of Optical Society of America B 22, 2635 (2005).

nplcit7: J. Goodman, ("Introduction to Fourier Optics", McGraw-Hill physical and quantum electronics series, 2005, ISBN 978-0-9747077-2-3)

The invention claimed is:

1. A method of measuring of the Strehl ratio of an ultrashort light pulse according to its combined temporal, spatial and spatio-temporal dimensions, comprising:

decomposing of said ultrashort light pulse into an initial pulse and a secondary initial pulse, which has a different polarization or direction than the initial pulse, wherein phase characteristics of the initial pulse and the secondary initial pulse are essentially identical to said ultrashort light pulse, measuring of a spatio-spectral intensity of the initial pulse;

storing the spatio-spectral intensity of the initial pulse to be compared to the spatio-spectral intensity of the pulse obtained after a nonlinear effect;

generating the nonlinear effect with a spatial focusing at least according to a transverse spatial dimension;

obtaining a second pulse by the nonlinear effect on the secondary initial pulse;

measuring of a spatio-spectral intensity of the secondary initial pulse;

a first calculating step of the spatio-spectral intensity of the initial pulse at least using a simulation of the nonlinear effect using the spatio-spectral intensity of the initial pulse without phase distortion, a second calculating step of the spatio-spectral intensity of the initial pulse at least using a simulation of the nonlinear effect using the spatio-spectral intensity of the initial pulse with a very large quadratic phase, stretching the initial pulse at least by a factor of 3 temporally and spatially compared to the initial pulse without distortion, estimating of the distortions of the initial pulse by comparing the different spectra obtained and translated into a Strehl ratio RI by using a formula $R_I = f(ISS1, ISS2, ISS3, ISS4)$, where f is a function that provides an estimate of the Strehl ratio through the spatio-spectral intensities, and ISS1 is the spatio-spectral intensity of the initial pulse, ISS2 is spatio-spectral intensity of the second pulse, ISS3 is the spatio-spectral intensity of the initial pulse according to the first calculating step, and ISS4 is the spatio-spectral intensity of the initial pulse according to the second calculating step.

2. The method of claim 1, wherein the method is performed in a single acquisition on a single initial pulse by synchronization of the measurement on the initial pulse to be measured.

3. The method of claim 1, wherein the obtaining a nonlinear effect further comprises a degenerate of a third-order.

4. The method of claim 1, wherein the Strehl ratio $R_I$ is calculated by using a formula $$R_I = f(ISS1, ISS2, ISS3, ISS4) = \sqrt{\frac{Z^2 - Z_\infty^2}{Z_0^2 - Z_\infty^2}},$$

where a Z-ratio is the ratio of the width of the spectrum obtained by spatial-spectral intensity integration of the second pulse along the spatial dimension to the width of the spectrum obtained by spatial-intensity integration of the initial pulse according to the spatial dimension, a ratio $Z_0$ is the ratio of the width of the spectrum obtained by the integration of the spatio-spectral intensity of the initial pulse according to the first calculating step and according to the spatial dimension of the width of the spectrum obtained by the integration of the spatio-spectral intensity of the initial pulse according to the spatial dimension, and a ratio $Z_\infty$ is the ratio of the width of the spectrum obtained by the integration of the spatio-spectral intensity of the initial pulse according to the second calculating step and according to the spatial dimension on the width of the spectrum obtained by the integration of the spatio-spectral intensity of the initial pulse according to the spatial dimension.

5. The method of claim 4, wherein the width of the spectrum are standard deviations.

6. The method of claim 1, wherein the measuring of the spatio-spectral intensity is performed by a spectrometer integrating the full beam according to the two transverse spatial dimensions to give a spectral measurement according to only the optical frequencies.

7. The method of claim 1, wherein generating the nonlinear effect occurs at the focal point of an optic focusing along the two transverse spatial dimensions.

8. The method of claim 7, wherein the two transverse spatial dimensions are one of the following group: parabola, spherical mirror, lens.

9. The method of claim 1, wherein generating the nonlinear effect further comprises a degenerate nonlinear effect of order 3.

10. The method of claim 9, wherein the degenerate nonlinear effect of order 3 further comprises a collinear polarization rotation mechanism.

11. The method of claim 1, wherein generating the nonlinear effect further comprises a generation of harmonics of order n greater than or equal to 2.

12. The method of claim 1, wherein measuring of the spatio-spectral intensity of the initial pulse is simultaneously made according to the two transverse spatial dimensions.

13. The method of claim 12, wherein measuring of the spatio-spectral intensity of the initial pulse is simultaneously made according to the two transverse spatial dimensions by two imaging spectrometers or by the combination of spatial measurements made with a camera and spectral measurements made with a spectrometer or an imaging spectrometer.

14. An apparatus for measuring of the Strehl ratio of an ultrashort light pulse according to its combined temporal, spatial and spatio-temporal dimensions, comprising:

a pulse-separating device for decomposing of said ultrashort light pulse into an initial pulse and a secondary initial pulse, which has a different polarization or direction than the initial pulse, wherein phase characteristics of the initial pulse and the secondary initial pulse are essentially identical to said ultrashort light pulse, a first imaging spectrometer for measuring of a spatio-spectral intensity of the initial pulse;

a first memory for storing the spatio-spectral intensity of the initial pulse;

a nonlinear medium interaction device for allowing interaction of the secondary initial pulse with a nonlinear optical material, said interaction generating, by a nonlinear optical mechanism of order n greater than or equal to 2, a secondary pulse of temporal intensity proportional to the intensity of the secondary initial pulse raised to the power of n, and of which one or both transverse spatial dimensions are focused in the nonlinear optical material;

a second imaging spectrometer for measuring the spatio-spectral intensity of the secondary pulse obtained by the nonlinear effect;

second memory for storing the spatio-spectral intensity of the secondary pulse obtained by the nonlinear effect;

a processor of a calculator configured to perform:
- a first calculation of the spatio-spectral intensity of the initial pulse is obtained from the simulation of the nonlinear effect using the spatio-spectral intensity of the initial pulse without phase distortion,
- a second calculation of the spatio-spectral intensity of the initial pulse is obtained from the simulation of the nonlinear effect using the spatio-spectral intensity of the initial pulse with a very large quadratic phase, stretching the impulse at least by a factor of 3 temporally and spatially compared to the pulse without distortion, and
- an estimate of the distortions of the pulse through comparing the different spectra obtained and translated into the Strehl ratio $R_I$, without estimating the phase of the pulse, by using a formula: $R_I$=f(ISS1, ISS2, ISS3, ISS4), where f is a function that provides an estimate of the Strehl ratio through the spatio-spectral intensities, and ISS1 is the spatio-spectral intensity of the initial pulse, ISS2 is spatio-spectral intensity of the second pulse, ISS3 is the spatio-spectral intensity of the initial pulse according to the first calculation, and ISS4 is the spatio-spectral intensity of the initial pulse according to the second calculation.

15. The apparatus of claim 14, wherein the Strehl ratio $R_I$ is calculated by using a formula $$R_I = f(ISS1, ISS2, ISS3, ISS4) = \sqrt{\frac{Z^2 - Z_\infty^2}{Z_0^2 - Z_\infty^2}},$$

where a Z-ratio is the ratio of the width of the spectrum obtained by spatial-spectral intensity integration of the second pulse along the spatial dimension to the width of the spectrum obtained by spatial-intensity integration of the initial pulse according to the spatial dimension, a ratio $Z_0$ is the ratio of the width of the spectrum obtained by the integration of the spatio-spectral intensity of the initial pulse according to the first calculation and according to the spatial dimension of the width of the spectrum obtained by the integration of the spatio-spectral intensity of the initial pulse according to the spatial dimension, and a ratio $Z_\infty$ is the ratio of the width of the spectrum obtained by the integration of the spatio-spectral intensity of the initial pulse according to the second calculation and according to the spatial dimension on the width of the spectrum obtained by the integration of the spatio-spectral intensity of the initial pulse according to the spatial dimension.

16. The apparatus of claim 15, wherein the width of the spectrum are standard deviations.

17. The apparatus of claim 14, wherein the first imaging spectrometer and the second imaging spectrometer are the same.

18. The apparatus of claim 14, wherein the first imaging spectrometer and the second imaging spectrometer further comprise a device allowing a beam to be focused according to the other transverse spatial dimension to measure the entire beam in the first device of the imaging spectrometer type and the second device of the imaging spectrometer type.

19. The apparatus of claim 14, wherein the first imaging spectrometer and the second imaging spectrometer further comprise a combination of a camera measuring the spatial intensities and imaging spectrometers measuring spatio-spectral intensities.

20. The apparatus of claim 14, wherein the first imaging spectrometer and the second imaging spectrometer further comprise performing measurements by focusing according to the two transverse spatial dimensions and by integrating them optically during the measurement to give measurements of the spectra of the initial pulse only according to the optical frequencies for the initial pulse and the secondary pulse only according to the optical frequencies for the secondary pulse.

* * * * *